(12) United States Patent
Yang et al.

(10) Patent No.: US 10,402,104 B2
(45) Date of Patent: Sep. 3, 2019

(54) DEVICES AND METHODS FOR A DATA STORAGE DEVICE

(71) Applicant: EMC IP Holding Company, LLC, Hopkinton, MA (US)

(72) Inventors: Lifeng Yang, Beijing (CN); Xinlei Xu, Beijing (CN); Jian Gao, Beijing (CN); Ruiyong Jia, Beijing (CN); Liam Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 15/277,131

(22) Filed: Sep. 27, 2016

(65) Prior Publication Data

US 2017/0090793 A1 Mar. 30, 2017

(30) Foreign Application Priority Data

Sep. 28, 2015 (CN) .......................... 2015 1 0628051

(51) Int. Cl.
*G06F 11/00* (2006.01)
*G06F 3/06* (2006.01)
*G06F 1/30* (2006.01)
*G06F 13/28* (2006.01)
*G06F 13/40* (2006.01)
*G06F 13/42* (2006.01)

(52) U.S. Cl.
CPC .............. *G06F 3/0619* (2013.01); *G06F 1/30* (2013.01); *G06F 3/065* (2013.01); *G06F 3/0631* (2013.01); *G06F 3/0689* (2013.01); *G06F 11/00* (2013.01); *G06F 13/28* (2013.01); *G06F 13/4027* (2013.01); *G06F 13/4282* (2013.01); *G06F 2212/402* (2013.01); *G06F 2213/0026* (2013.01)

(58) Field of Classification Search
CPC .... G06F 1/30; G06F 13/4282; G06F 13/4027; G06F 3/0689; G06F 3/065; G06F 3/0631; G06F 3/0619; G06F 13/28; G06F 13/40; G06F 13/42; G06F 3/06
USPC ................................................... 711/154, 114
See application file for complete search history.

(56) References Cited

U.S. PATENT DOCUMENTS 6,527,721 B1 * 3/2003 Wittrock .................. A61B 8/00
600/446
9,823,968 B1 * 11/2017 Fugini ................. G06F 11/1076
(Continued)

FOREIGN PATENT DOCUMENTS

CN 1991791 7/2007
CN 101446926 6/2009
(Continued)

*Primary Examiner* — Pierre Miche Bataille
(74) *Attorney, Agent, or Firm* — BainwoodHuang

(57) ABSTRACT

The present disclosure relates to an apparatus for a data storage device, an adapter, an array controller, a data storage device, and a relevant method. The apparatus for the data storage device comprises: a power management module configured to detect power-off of a power supply and to switch to a backup battery unit in the data storage device in response to detecting the power supply. The apparatus is configured to cause the backup battery unit to supply power only to the volatile memory in the data storage device. By using a solution according to the present disclosure, for example, preserving time for data may be prolonged in the case of power-off.

20 Claims, 4 Drawing Sheets

(56) References Cited

U.S. PATENT DOCUMENTS

| | | | | |
|---|---|---|---|---|
| 2012/0072651 A1* | 3/2012 | Randell | ............... | G06F 11/1068 |
| | | | | 711/103 |
| 2012/0254636 A1* | 10/2012 | Tsukamoto | ............... | G06F 1/30 |
| | | | | 713/300 |
| 2014/0201562 A1* | 7/2014 | Breakstone | ............... | G06F 1/30 |
| | | | | 713/600 |

FOREIGN PATENT DOCUMENTS

| | | | | |
|---|---|---|---|---|
| EP | 0181943 A1 * | 5/1986 | ............... | G06F 1/30 |
| WO | WO-2011082362 A1 * | 7/2011 | .......... | G06F 11/1068 |

\* cited by examiner

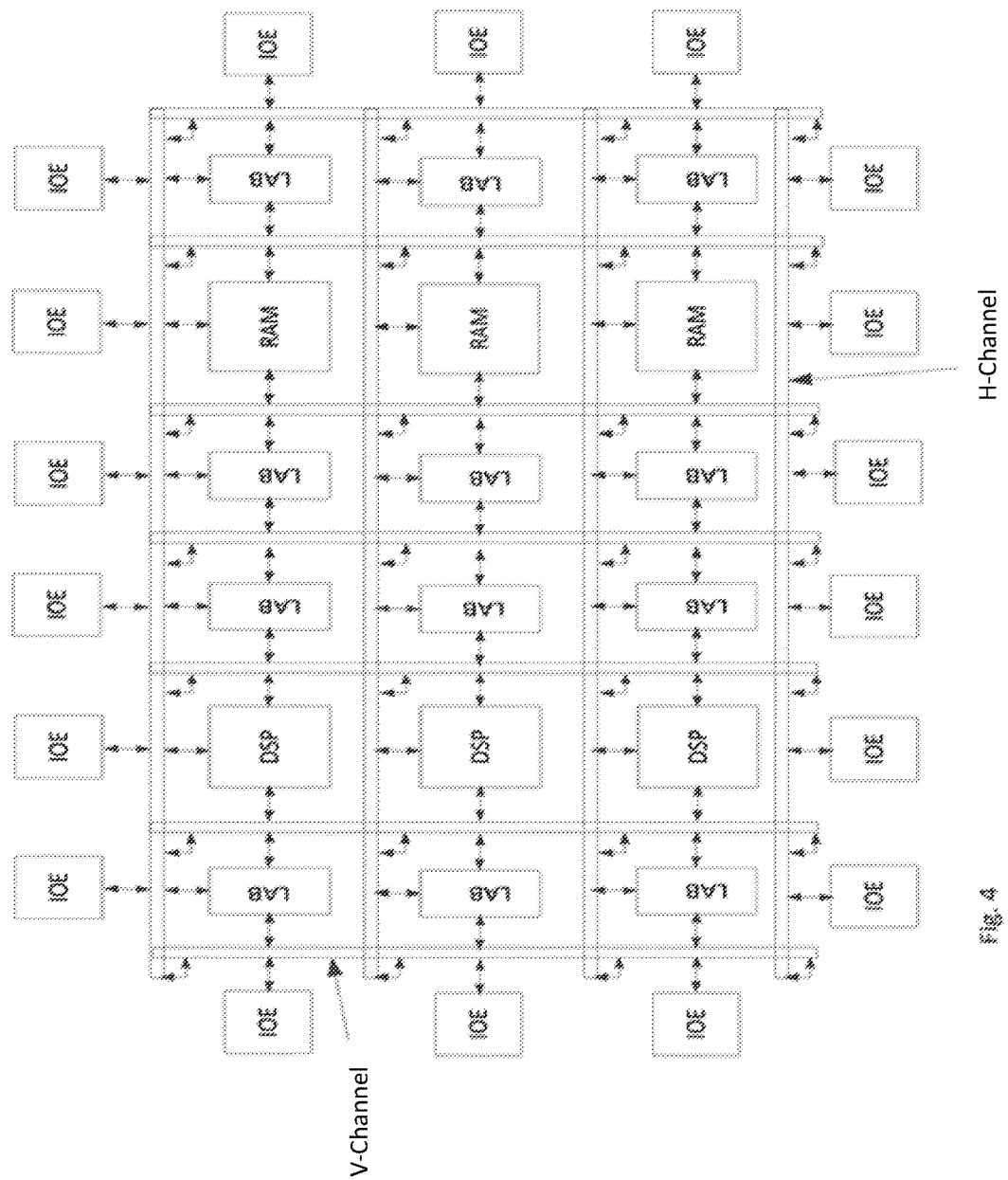

DEVICES AND METHODS FOR A DATA STORAGE DEVICE

RELATED APPLICATION

This application claim priority from Chinese Patent Application Number CN201510628051.3, filed on Sep. 28, 2015 at the State Intellectual Property Office, China, titled "APPARATUS FOR DATA STORAGE DEVICE AND METHOD THEREOF," the contents of which is herein incorporated by reference in its entirety.

FIELD

The present disclosure generally relates to the electronic field, and more specifically relates to a data storage device, particularly a data storage device using a disk array.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

In view of the above, the present disclosure makes improvement to existing data storage devices.

In a first aspect of the present disclosure, there is provided an apparatus for a data storage device. The apparatus comprises: a power management module configured to detect power failure of a power supply and switch to a backup battery unit in the data storage device in response to detecting the power-off of the power supply. The apparatus is configured to cause the backup battery unit only to supply power to a volatile memory in the data storage device.

In a second aspect of the present disclosure, there is provided an adapter comprising the apparatus above and a volatile memory coupled to the apparatus.

In a third aspect of the present disclosure, there is provided an array controller, comprising the adapter mentioned above, a root complex PCI-Express bridge, a processor, and a system memory. The adapter, the system memory, and the processor are coupled to the root complex PCI-Express bridge.

In a fourth aspect of the present disclosure, there is provided a data storage device. The data storage device comprises at least two array controllers mentioned above, the array controllers being connected with each other.

In a fifth aspect of the present disclosure, there is provided a programmable apparatus used in a redundant array of independent disks device. The programmable apparatus comprises a computing module configured to perform parity check.

In a sixth aspect of the present disclosure, there is provided an adapter. The adapter comprises the programmable apparatus mentioned above and the volatile memory coupled to the programmable apparatus.

In a seventh aspect of the present disclosure, there is provided an array controller. The array controller comprises the adapter mentioned above, a root-complex PCI-Express bridge, a processor, and a system memory. The adapter, the system memory, and the processor are coupled to the root-complex PCI-Express bridge.

In an eighth aspect of the present disclosure, there is provided a data storage device. The data storage device comprises at least two array controllers mentioned above, the array controllers being connected with each other.

In a ninth aspect of the present disclosure, there is provided a method of saving dirty data of a volatile memory in a data storage device in the case of power-off. The method comprises: detecting power-off of a power supply; in response to detecting the power-off, only supplying power to the volatile memory in the data storage device using a backup battery unit.

In a tenth aspect of the present disclosure, there is provided a method of computing parity check in a data storage device. The method comprises: computing, by a computing module in a programmable apparatus, parity check based on data and a parameter received from a system memory in the data storage device; and storing a result of the computing in the data storage device.

With embodiments of the present disclosure, an improvement effect of a data storage device may be achieved, e.g., prolonging preserving time for data or reducing a workload of a central processing unit (CPU) in the case of power-off.

BRIEF DESCRIPTION OF THE DRAWINGS

Through more detailed depiction of the example embodiments of the present disclosure with reference to the accompanying drawings, the above and other objectives, features, and advantages of the present disclosure will become more apparent, wherein in the example embodiments of the present disclosure, the same reference numerals usually represent the same components.

FIG. 4 shows a schematic diagram of an implementation structure of FPGA.

DETAILED DESCRIPTIONS

Figure 1:
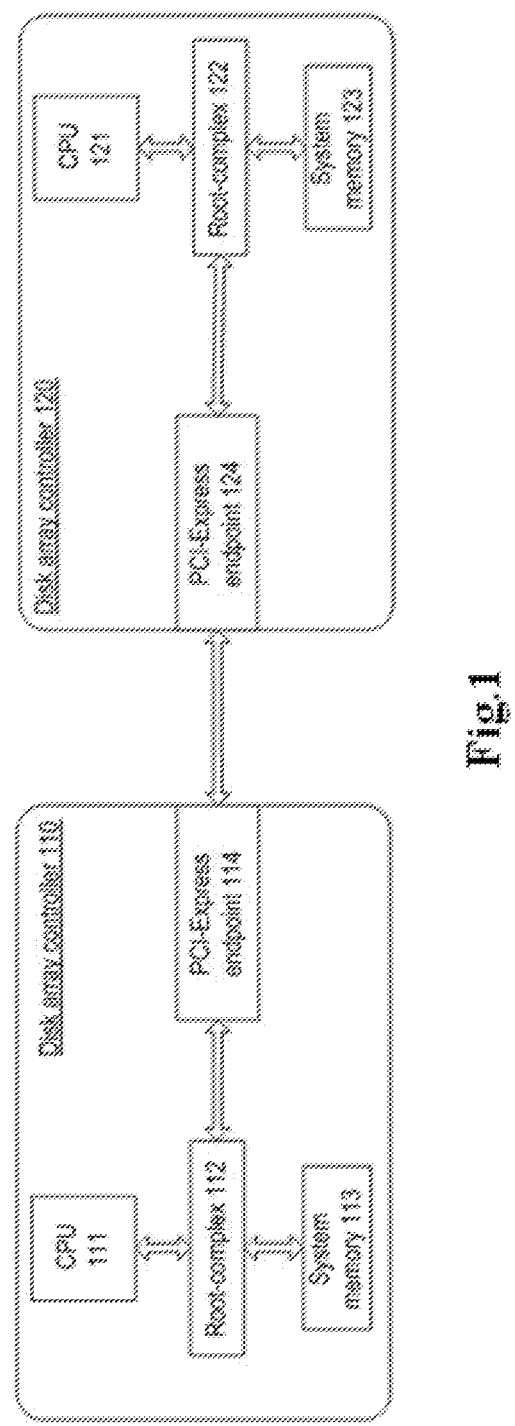
FIG. 1 shows an example diagram of a controller structure in a conventional disk array.

Hereinafter, some details will be illustrated so as to provide thorough understanding of various aspects of the subject content of the present disclosure. However, the subject content of the present disclosure may be still implemented without these details.

Unless otherwise required, in the full text of the specification and the appended claims, the word "comprise" will be interpreted as an open inclusion meaning, i.e., interpreted as "including, but not limited to."

In the full text of the present specification, reference of "one embodiment" or "embodiment" means that specific characteristics, structures or features described in conjunction with the embodiment are included in at least one embodiment. Therefore, in the full text of the present specification, the expression "in one embodiment" or "in the embodiment" appearing in various parts of the full text of the present specification does not necessarily refer to the same aspect. In addition, specific characteristics, structures or features may be combined in any appropriate manner in one or more aspects of the present disclosure.

With the development of information technologies, the functions of electronic devices have become more and more powerful and popular. Mass data are generated from use of the electronic devices, while all of these data need to be stored. For an enterprise or network service provider, a data storage device with a larger capacity is particularly needed to record relevant data or provide relevant services.

In the field of enterprise data storage, a disk array is a general choice. The disk array refers to a disk group that is composed of many disks and has a huge capacity. The efficacy of the entire disk system is enhanced due to an incremental effect generated from providing data by individual disks. With this technology, the data are segmented into many sectors which are stored on respective hard disks, respectively. The disk array can still read out data using parity check in case of failure of any one of the hard disks in an array. In data rebuilding, the data, after being calculated, are re-placed in a new hard disk.

In the article "A Case for Redundant Arrays of Inexpensive Disks" published by the University of California-Berkeley in 1988, the term RAID was discussed, and 5 tiers of RAID were defined. The objective of Berkeley's study was reflecting the CPU's fast computing performance at that time. The CPU efficacy grew about 30%~50% annually, while the hard disk machine could only grow about 7%. The seminar wished to find a new technology that could immediately enhance efficacy in a short term to balance the computational capability of computers. At that time, the main study objective of Berkeley's seminar was efficacy and cost. In addition, the seminar also designed out a fault-tolerance and logical data redundancy, thereby creating a RAID theory.

RAID (Redundant Array of Independent Disks) is an approach of storing the same data at different locations in multiple hard disks (thereby, redundantly). By placing data on multiple hard disks, the input output operations can overlap in a balanced manner, thereby enhancing the performance. Because a mean time between failures (MTBF) is increased due to multiple hard disks, fault tolerance also increases due to storing redundant data.

The advantage of RAID lies in enhancement of the transmission rate. The RAID enhances data throughput of the system to a great margin by storing and reading data simultaneously on multiple disks. In RAID, many hard disk drivers may be enabled to transmit data simultaneously, while these disk drivers are then logically equivalent to one hard disk driver. Therefore, use of RAID may reach several folds, tens of folds, or even hundreds of folds of the rate of an individual hard disk driver, which was also a problem that initially intended to be solved by RAID. Because the rate of CPU at that time grew very fast, while the data transmission rate of the hard disk driver could not be enhanced substantially, a solution was needed to solve the contradiction therebetween.

The fault-tolerance function is provided through data check. A common hard disk driver cannot provide a fault-tolerance function without a CRC (cyclic redundant check) code written on the hard disk. The RAID fault-tolerance is built on the hardware fault-tolerance function of individual disk drivers. Therefore, a higher security is provided. Many RAID modes have relatively perfect mutual check/recovery measures, even direct mutual mirror and backup, thereby greatly enhancing the fault-tolerance degree of the RAID system and the stable redundancy of the system.

However, the current data storage devices still have certain room for improvement, e.g., data security of in the case of power failure.

In the field of data storage, as mentioned above, one of common storage devices is a redundant array of independent disks (RAID). Currently, RAID may be substantially divided into RAID 0, RAID 1, RAID 2, RAID 3, RAID 4, RAID 5, RAID 6, and RAID 7, etc.

RAID 0 is the earliest RAID mode, i.e., a data stripping technology. RAID 0 is a simplest form in building a disk array, which only needs more than two hard disks. RAID 0 can enhance the performance and throughput of the whole disk with a low cost. RAID 0 does not provide redundant or error repair capability, but its implementation cost is the lowest. The simplest implementation manner of RAID 0 is serially-connecting N identical hard disks in the form of hardware by an intelligent had disk controller or in the form of software by a disk drive program in an operating system, thereby creating a large volume set. During use, computer data are written into respective hard disks in succession, the largest advantage of which is enhancing the capacity of the hard disk by multiples. If a RAID 0 mode is built using three hard disks of 80 GB, the disk capacity will amount to 240 GB. Its speed is completely identical to that of an individual hard disk. However, its biggest drawback lies in that when any hard disk fails, the entire system will be damaged, and the reliability is only 1/N of an individual hard disk.

RAID 1 is referred to as disk mirror. The principle is mirroring data of one disk onto another disk. In other words, when data are written onto one disk, a mirror file will be created on another idle disk, which guarantees system reliability and reparability to the most extent without affecting the performance. As long as at least one disk in any pair of mirror disks in the system is usable, or even when half of hard disks fail, the system can still run normally. When one disk fails, the system will ignore this hard disk and turns to using a remaining mirror disk to read and write data, which has a good disk redundancy capability. Despite of its absolute data security, its cost will increase significantly. RAID 1 mainly implements disk mirror through secondary reading and writing, such that the load of the disk controller is also considerably heavy, particularly in an environment that needs frequently writing data. In order to avoid occurrence of performance bottleneck, it becomes essential to use many disk controllers.

Conceptually speaking, RAID 2 is similar to RAID 1. They are both stripping data and distributing them onto different hard disks. A strip unit is bit or byte. However, RAID 2 provides error check and recovery using a certain encoding technology. This encoding technology needs a plurality of pieces of information about disk storage check and recovery. Therefore, RAID 2 scheme is more complex to implement. This is why it is rarely used in a business environment.

RAID 3, different from RAID 2, can only check error, but cannot correct error. It processes one band zone at one time when accessing data. In this way, the reading and writing speeds can be enhanced. The check code is generated when writing data and saved onto another disk. In the case of needing implementation, the user should have more than three drivers, such that the write speed and read speed are both very high. Because the check bits are relatively fewer, the computation time is relatively shorter. It is very difficult to implement RAID control using software, and implementation of the controller is not very easy either. It is mainly used for scenarios that are highly demanding on throughput such as graphs (including animations). Different from RAID 2, RAID 3 uses an individual disk to store parity information. If one disk fails, the parity disk and other data disk may re-generate data. If the parity disk becomes invalid, data use will not be affected. RAID 3 may provide a good transmission rate for mass continuous data. But for random data, the parity disk will become a bottleneck for a writing operation.

RAID 4 is like RAID 3 except that its data access is performed as per data blocks, i.e., as per disks, one disk for each time. Its features are also similar to RAID 3, except that it is more difficult for failure recovery than RAID 3, and the controller design is also far more difficult. In addition, its efficiency in data access is not ideal.

The parity check codes of RAID 5 are existent on all disks, wherein p0 represents the parity check value of $0^{th}$ stripe, and so on. RAID 5 has a very high read efficiency, but an ordinary writing efficiency, while its block-type collective access efficiency is not bad. Because parity check codes are on different disks, the reliability is enhanced. However, it cannot solve concurrency of data transmission well, and the controller design is also very difficult. Compared with RAID 5, an importance difference lies in that RAID 3 needs to involve all array disks for each time of data transmission, while for RAID 5, transmission of most data is only operated on one disk, with concurrent operation being enabled. "Write loss" exists in RAID 5, i.e., for each write operation, four actual read/write operations will be generated, wherein old data and parity information is read twice, and new data and parity information are written twice.

RAID 6, as an extension to RAID 5, is mainly used for a scenario requiring that the data should be absolutely error-free. Because RAID 6 introduces a second kind of parity check value, it needs N+2 disks. Meanwhile, design of the controller becomes very complex, with a relatively low write speed. Besides, much time is taken for calculating the parity check value and verifying data correctness, which causes unnecessary load.

For RAID 7, All I/O transmissions are performed synchronously and can be controlled separately. This enhances system concurrency as well as data access rate of the system. Each disk has a cache. A real-time operating system may use any real-time operation chip, satisfying needs of different real-time systems. RAID 7 allows use of an SNMP protocol to manage and monitor, such that an independent transmission channel may be designated for a check zone so as to enhance efficiency. A plurality of hosts may be connected. Due to introduction of the cache, when multiple users access the system, the access time is nearly 0. Due to employment of the parallel structure, the data access efficiency is greatly enhanced. It is noted that introduction of the cache has advantages and drawbacks. Because once the system is power-off, the data within the cache will be completely lost. Therefore, it has to work with the backup power supply. However, out of the consideration of miniaturization and cost of the system, the backup power supply, such as a capacitor or a battery within the device, can only sustain for example 300 seconds for a high-performance data storage device. For a large cache, this duration might be insufficient to write data in the cache into for example a disk, which easily causes data loss.

Besides, as stated above, a data storage device of RAID series also has a problem of a high CPU load.

In order to overcome at least some of the above technical problems, some embodiments of the present disclosure intend to solve at least some of the technical problems.

Reference is now made to FIG. 1, which shows an example diagram of a controller structure in a conventional disk array. For a data storage device, particularly for an enterprise data storage device, data security and stability are particularly important. Therefore, it is essential to back up data. FIG. 1 shows a schematic diagram of a common disk array controller structure in the data storage device (e.g., a disk array).

As shown in FIG. 1, the data storage device (not shown) usually comprises at least two peer disk array controllers 110 and 120, wherein the disk array controller 110 comprises a central processing unit (CPU) 111, a root-complex PCI-Express bridge 112, a system memory 113 and a PCI-Express endpoint 114, and the disk array controller 120 comprises a central processing unit (CPU) 121, a root-complex PCI-Express bridge 122, a system memory 123, and a PCI-Express endpoint 124. As understood by those skilled in the art, CPUs 111 and 121 perform functions such as processing instructions, executing operations, processing data and control. The system memories 113 and 123 are used for storing data and program, etc. CPU 111 or 121 writes data into the system memory 113 or 123 through the root-complex PCI-Express bridge 112 or 122, such that the system memory 113 or 123 directly accesses (DMA) the disk (not shown), to write dirty data onto a disk or read data from the disk. Those skilled in the art may understand that the dirty data refer to data stored in for example, a CPU, a system memory, or a volatile memory, but not stored in the disk. In other words, the dirty data are easily lost after system power-off, and cannot be stored in a long term like the data stored in the disk.

It would be appreciated that for data storage, data security is crucial. Therefore, many methods and devices have been developed for backing up data or recovering data in the case of data loss or damage. For a disk array, a method of backing up data or mirroring data is usually employed to maintain consistency of the data, such that even one disk array controller is damaged (e.g., the disk array controller 110 as shown in FIG. 1), another disk array controller (e.g., the disk array controller 120 shown in FIG. 1) of the mirror may also be used. In order to maintain consistency between data in the two disk array controllers, in response to receiving the program or data on the system memory 113, the program or data is also usually mirrored to the system memory 123 through PCI-Express endpoints 114 and 124, such that when the disk array controller A 110 is damaged or fails, a further disk array controller B 120 of the mirror may be used.

Besides, a persistent memory MCC (multi-core cache) is for storing dirty data in the memory. In response to powering off or temporarily losing power of the memory array, the MCC will flush these dirty data into a system hard disk (HDD) using the backup power supply so as to guarantee no data loss; and in response to re-powering the system, these data will be first recovered from HDD to the MCC persistent memory, such that the data will not be lost.

The CPU will record the operation procedure through a series of information about operations. Once recovered from power-off or breakdown, these operations will be first re-done based on these records.

The mirror memory has duplicated data in the persistent memory and an associated control structure. In response to updating the cache, operations are first performed on a persistent memory on a disk array controller, and these operations are copied to the persistent memory on another disk array controller. These duplications or transmissions are generally performed via a CMI interface between two nodes.

Besides, for RAID 3-RAID 6, at least one of the CPUs 111 and 121 are usually used for parity check computation, and the computation result is finally stored to the disk via the root-complex PCI-Express bridges 112 and 122. Because all received data have to be subject to parity check computation and the computation results have to be stored, more resources of the CPU are occupied, resulting in a heavy load to the CPU. The explanations of RAID 3-RAID 6 above are exemplary, not intended to limit Those skilled in the art may understand that in other type of data storage devices, for the sake of maintaining data consistency or security, many resources of a computing unit such as CPU are also needed to occupy.

Besides, when the external power supply (e.g., mains supply or civil alternating current) powers off suddenly, the backup power supply (e.g., a capacitor or battery) within the data storage device supplies power to the devices including the disk array controller and the disk. Due to limit of the capacity of the capacitor or battery, it usually can only maintain about 300 seconds at most. Within the 300 seconds, it is needed to write data and program in the CPU and the system memory into a specific zone of the disk, so as to re-load the data and program after power supply is resumed. In some types of storage devices, the time might be insufficient to write all data and program in the CPU and the system memory into the disk.

Figure 2:
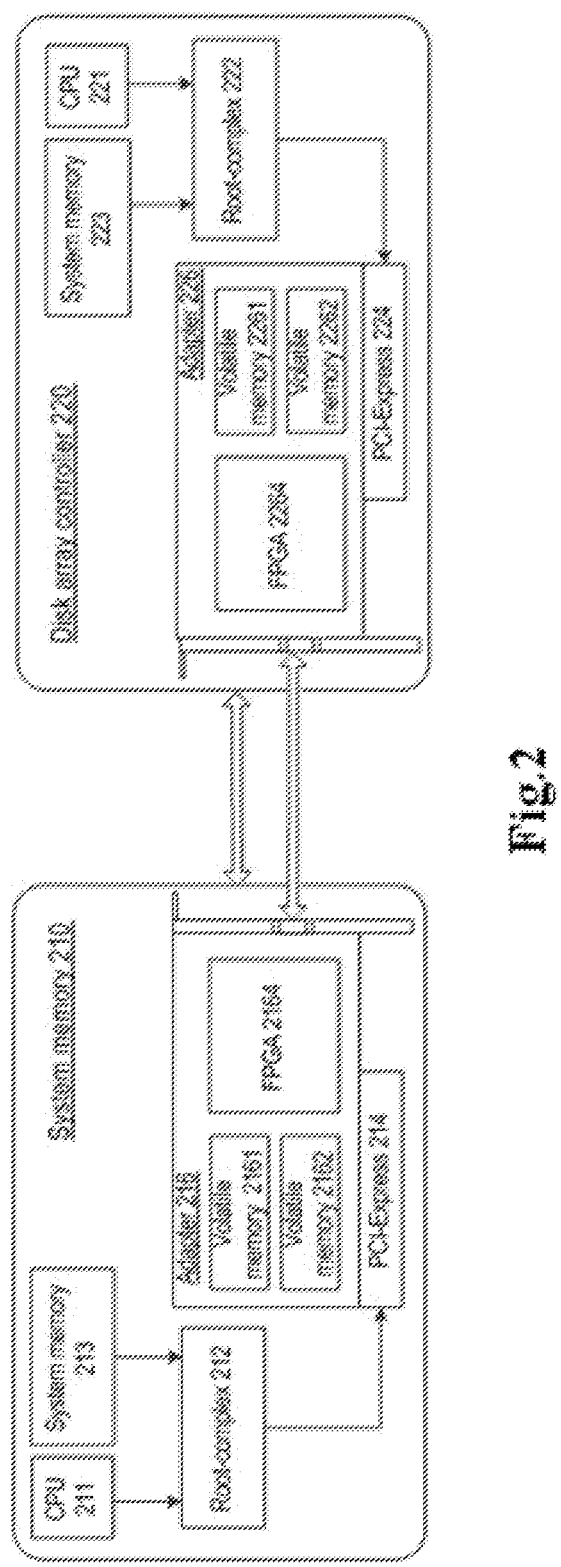
FIG. 2 shows an example diagram of a controller structure for a disk array according to one embodiment of the present disclosure.

Therefore, further improvement is desired for the existing data storage devices such as disk array. FIG. 2 shows an example diagram of a controller structure for a disk array according to one embodiment of the present disclosure. In the example of FIG. 2, the overall architecture is similar to that as shown in FIG. 1. The same components are not detailed here. The difference between FIG. 2 and FIG. 1 lies in that the disk array controller 210 and the disk array controller 220 include an adapter 216 and an adapter 226 provided according to one embodiment of the present disclosure, respectively. The adapter may be provided in multiple manners, e.g., an adapter card. Those skilled in the art may understand that the adapter card is exemplary, not intended for limitation. Other forms of adapter devices may be provided.

In order to release the CPU from a heavier workload, an idea according to one embodiment of the present disclosure is migrating part of computation functions from the CPU to other devices, e.g., a programmable apparatus, such as a programmable logic device. FIG. 2 shows a form of the programmable logic device, i.e., a field programmable logic gate array (FPGA). Those skilled in the art may understand that other forms of programmable logic devices may be used, e.g., a complex programmable logic device. For parity check computation regarding RAID 3-RAID 6, FPGA has higher computation efficiency than the CPU. Therefore, an idea according to one embodiment of the present disclosure is migrating the parity check operation performed by the CPU to the FPGA in the newly added adapter, e.g., FPGAs 2164 and 2264 as shown in FIG. 2. In response to being instructed to perform a parity check operation, FPGA coordinates with the CPU. The FPGA (e.g., a memory control module in FPGA, e.g., the memory controller 330 in FIG. 3) initiates a read request from a system memory (e.g., system memory 213 or 223), obtains the data and a parameter required for computing the parity check, allocates idle computing units (e.g., a computing module 320 shown in FIG. 3) in the FPGA to perform parity check computation, and returns computation results to the disk in sequence.

As mentioned above, in order to maintain data consistency and security, it is needed to back up the data in the CPU's cache and system memory to corresponding units in another disk array, i.e., a cache and a system memory. In the example of FIG. 2, the same functions are implemented using FPGA and volatile memory. In response to writing data into the volatile memory 2161 or 2162 by the disk array controller, the FPGA 2164 in the adapter 216 copies data and writes a duplicate into the non-volatile memory 2261 or 2262 in the array controller 220 via a serial connection (e.g., SerDes) between controllers 210 and 220. All write operations are transmitted through a high-speed serial bus between two nodes. Therefore, write operation of the duplication is executed by FPGA (e.g., a mirror module 330 in the FPGA in FIG. 3), without a need of execution by the CPU, thereby alleviating the burden of the CPU. As mentioned above, the data in the cache are mirrored and backed up between two disk array controllers. The mirror module may for example be a memory direct access unit that directly writes data in the system memory into the volatile memory according to an instruction from a processor in the data storage device and directly copies the data to another volatile memory via an interconnection module (e.g., the SerDes above). The mirror module may also cause data written in the volatile memory to a volatile memory in another array controller via a PCI-Express (e.g., PCI-Express 214 and 224). Those skilled in the art may understand that the mirror module may have a plurality of implementation manners, and the memory direct access unit is only exemplary, not intended to limit By using a mirror unit such as a memory direct access unit, no memory copy is performed between the CPU and the persistent memory, and the cached data are DMAed (direct memory accessed) from the direct memory access (DMA) from the system memory to the persistent memory, and directly mirrored and copied to a persistent memory in another array controller via a high-speed serial channel.

Those skilled in the art may understand that the two disk array controllers in FIG. 2 are only exemplary. More disk array controllers may exist, which may be connected through various topological structures.

Figure 3:
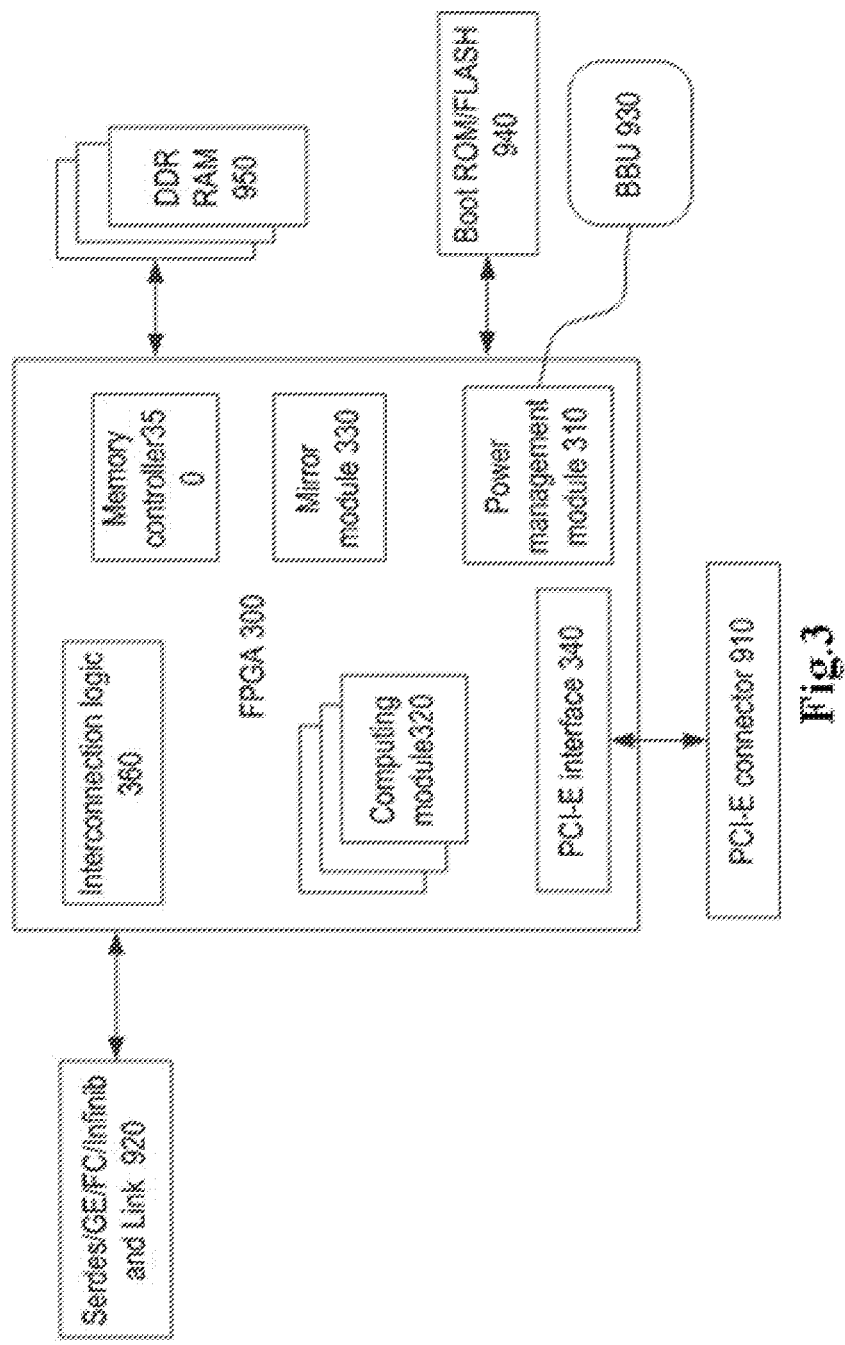
FIG. 3 shows an example diagram of a field programmable gate array (FPGA) of FIG. 2 and its peripheral devices.

Refer to FIG. 3, in which an example diagram of a field programmable gate array (FPGA) of FIG. 2 and its peripheral devices is presented. The FPGA 300 is a specific example of FPGA 2164 or 2264 in FIG. 2, comprising an interconnection logic or interconnection module 360, a memory controller 350, a computing module 320, a mirror module 330, a PCI-E interface 340, and a power management module 310. Those skilled in the art may appreciate that the above modules are only exemplary. The FPGA 300 may also have other functional modules, e.g., an online upgrading module (not shown). The online upgrading module is implemented through BootRom or Flash 940 technology.

The interconnection logic 360 may be used for implementing an interconnection 920 for transmission, access, and the like between two array controllers, such as SerDes. Those skilled in the art may understand that, besides SerDes, the interconnection may also have other forms, such as Ethernet and Infiniband Link.

The computing module 320 may for example be used for implementing the parity check operation above, thereby alleviating an operation load of the CPU. Those skilled in the art may understand that the parity check operation is only an example for RAID 3-RAID 6. There may also be other computation operations, such as Hamming code operation, data encryption and decryption, etc.

The mirror module 330 may be used, for example, for implementing mutual backup of the data between the memory in the two array memories mentioned above and cache.

The PCI-E interface module 340 may be connected to a PCI-E connector 910 external to the FPGA, for receiving data or instruction from the CPU, for example.

The memory controller 350 is configured to initiate a read request to a system memory (e.g., system memory 213 or 223 in FIG. 2) in the data storage device; receive data and a parameter for computing parity check; allocate computational resources in the computing module; and send results of computation to a processor in the data storage device. More specifically, the memory controller 350 is configured to allocate a part of computational resources in idle computation resources in the computing module to compute parity check.

The power management module 310 is coupled to a backup power supply 930 in the storage device, e.g., a capacitor or battery. As previously depicted for FIG. 1, in the existing storage device, in response to powering-off the storage device, the disk array controller 110 or 120 immediately powers off or is only supported by a mainboard capacitor for 2 to 5 seconds. This time is too short to save dirty data in a backend for storage, e.g., a hard disk. This easily causes loss of data in the memory and the cache in the CPU.

According to one embodiment of the present disclosure, in the example of FIG. 3, the power management module 310 may check an AC power supply, and in response to detecting the power-off, the backup power supply 930 is immediately initiated. According to the embodiments of the present disclosure, the power management module 310 is configured to supply power to the volatile memory. Because the backup power supply 930 only supplies power to the volatile memory, the data in the volatile memory may be maintained for a longer time, e.g., 24-72 hours. As long as the data storage device resumes power supply within 24 to 72 hours, the data in the volatile memory might not be lost. For example, in response to resuming the power supply, the disk array controller will be restarted to check whether the volatile memory still has dirty data not saved in the hard disk. In the case of existence, the dirty data will be saved in the disk. Preferably, the data in the CPU and the system memory may be written into the volatile memory in the case of power-off, and maintained for a longer time, e.g., 24 hours. If power supply is resumed within 24 hours after power-off, corresponding data may be reloaded into the CPU and the system memory.

Refer to FIG. 4, in which an embodiment for implementing the FPGA in FIGS. 2 and 3 is presented. As shown in FIG. 4, FPGA, for example, comprises a two-dimensional array of functional blocks. These functional blocks comprise a logic array block (LBA) and other functional blocks, e.g., a random access memory (RAM) block and a digital signal processing (SDP) block. The FPGA also comprises a programmable interconnection according to the form of horizontal and vertical channels, each channel comprising one or more route wires. In addition, the input/output element (IOE) may be located surrounding the periphery of the chip. The blocks such as LAB may be programmed to implement different functions through IOE, such as the interconnection logic or interconnection module 360, the memory controller 350, the computing module 320, the mirror module 330, the PCI-E interface 340, and the power management module 310 as shown in FIG. 3.

Generally, the present disclosure relates to an apparatus for a data storage device, comprising: a power management module configured to detect power-off of a power supply and switch to a backup battery unit in the data storage device in response to detecting the power-off of the power supply. The apparatus is configured to cause the backup battery unit to supply power only to a volatile memory in the data storage device.

Alternatively, the apparatus further comprises a computing module configured to perform parity check.

Alternatively, the computing module is further configured to perform data encryption and decryption.

Alternatively, the apparatus further comprises a mirror module configured to copy data received by the volatile memory from a system memory in the data storage device to a further volatile memory.

Alternatively, the mirror unit is configured to directly copy the data in the volatile memory to the further volatile memory through an interconnection module include in the apparatus.

Alternatively, the mirror module includes a memory direct access unit configured to in response to an instruction from a processor in the data storage device, directly write data in the system memory into the volatile memory and directly copy the data via the interconnection module to the further volatile memory.

Alternatively, the apparatus further comprises a PCI-Express interface module configured to exchange data and instructions via the PCI-Express link.

Alternatively, the apparatus further comprises an updating module configured to perform software update to the apparatus based on the received data.

Alternatively, the apparatus further comprises a memory controller configured to initiate a read request to a system memory in the data storage device; receive data and a parameter for computing parity check; allocate computational resources in the computing module; and send a result of computing to a processor in the data storage device.

Alternatively, the controller allocates a part of computational resources in idle computational resources in the computing module for computing parity check.

Alternatively, the apparatus is a field programmable gate array apparatus, the data storage device is a redundant array of independent disks device, and the volatile memory is a dynamic random access memory.

The present disclosure further relates to an adapter, comprising an apparatus according to any one of the above items and the volatile memory coupled to the apparatus.

The present disclosure further relates to an array controller, comprising the adapter above, a root-complex PCI-Express bridge, a processor, and a system memory. The adapter, the system memory, and the processor are coupled to the root-complex PCI-Express bridge.

The present disclosure further relates to a data storage device, comprising at least two array controllers as above mentioned, the array controllers being connected with each other.

The present disclosure further relates to a programmable apparatus used in a redundant array of independent disks device, comprising: a computing module that is configured to perform parity check.

Alternatively, the computing module is further configured to perform data encryption and decryption.

Alternatively, the apparatus further comprises a power management module configured to detect power-off of a power supply and switch to a backup battery unit in the data storage device in response to detecting the power-off of the power supply. The apparatus is configured to cause the backup battery unit to only supply power to a volatile memory in the data storage device.

Alternatively, the apparatus further comprises a mirror module configured to copy data received by the volatile memory from a system memory in the data storage device to another volatile memory.

Alternatively, the mirror unit is configured to directly copy data in the volatile memory to the further volatile memory through an interconnection module included in the programmable apparatus.

Alternatively, the mirror module is a memory direct access unit configured to in response to an instruction from a processor in the data storage device directly write data in the system memory into the volatile memory and directly copy the data to the further volatile memory through the interconnection module.

Alternatively, the apparatus further comprises a PCI-Express interface module configured to exchange data and instructions via a PCI-Express link.

Alternatively, the apparatus further comprises an updating module configured to perform software update to the apparatus based on the received data.

Alternatively, the apparatus further comprises a controller that is configured to: initiate a read request to a system memory in the data storage device; receive data and a parameter for computing parity check; allocate computational resources in the computing module; and send a result of computing to the processor in the data storage device.

Alternatively, the controller is configured to allocate a part of computational resources in idle computational resources in the computing module for computing parity check.

Alternatively, the programmable apparatus is a field programmable gate array apparatus, the data storage device is a redundant array of independent disks device, and the volatile memory is a dynamic random access memory.

The present disclosure further relates to an adapter, comprising a programmable apparatus according to any one of the above items and the volatile memory coupled to the programmable apparatus.

The present disclosure further relates to an array controller, comprising an adapter mentioned above, a root-complex PCI-Express bridge, a processor, and a system memory. The adapter, the system memory, and the processor are coupled to the root-complex PCI-Express bridge.

The present disclosure further relates to a data storage device, comprising at least two array controllers mentioned above, the array controllers being interconnected.

The present disclosure further relates to a method for saving dirty data of a volatile memory in a data storage device in the case of power-off, comprising: detecting power-off of a power supply; in response to detecting the power-off, only supplying power to the volatile memory in the data storage device using a backup battery unit.

Alternatively, the data storage device is a redundant array of independent disks device, and the volatile memory is a dynamic random access memory.

The present disclosure further relates to a method for computing parity check in a data storage device, comprising: computing parity check based on data and a parameter received from a system memory in the data storage device using a computing module in the programmable apparatus; and storing a result of the computing in the data storage device.

Alternatively, the data storage device is a redundant array of independent disks device, and the programmable apparatus is a field programmable gate array.

It should be noted that although a plurality of units or submits of the system have been mentioned in the detailed depiction above, such partitions are only non-compulsory. Actually, according to the embodiments of the present invention, features and functions of two or more units described above may be instantiated in one unit. In turn, features and functions of one unit described above may be further divided to be embodied by multiple units.

In addition, although operations of the method according to the present disclosure have been described in a specific sequence in the accompanying drawings, it does not require or imply that these operations must be performed according to this specific sequence, or a desired result can only be achieved by completing all of the shown operations. On the contrary, the steps depicted in the flow diagrams may change their execution sequences. Additionally or alternatively, some steps may be omitted; a plurality of steps may be merged into one step for execution, and/or one step may be decomposed into a plurality of steps for execution.

Although the present disclosure has been described above with reference to several embodiments, it should be understood that the present disclosure is not limited to the preferred embodiments disclosed above. The present disclosure intends to cover various modifications and equivalent arrangements included within the spirit and scope of the appended claims. The scope of the appended claims tallies with broadest explanations, thereby including all such amendments, equivalent structures and functions.

What is claimed is:

1. A programmable apparatus for a data storage device, comprising:
   a power management module comprising a portion of a field programmable gate array (FPGA) configured to:
      detect power-off of a power supply, and
      switch to a backup battery unit in the data storage device in response to detecting the power-off of the power supply;
   the programmable apparatus being configured to cause the backup battery unit to supply power only to a volatile memory in the data storage device;
   wherein the programmable apparatus is enabled to facilitate processing of data by the data storage device separate from a CPU when the CPU is powered by the power supply prior to power-off of the power supply;
   wherein the CPU becomes unpowered in response to power-off of the power supply; and
   wherein, in response to power-off of the power supply and switching to the backup battery unit, the volatile memory in the data storage device consumes power from the backup battery unit to maintain data previously written to the volatile memory.

2. The apparatus according to claim 1, further comprising: a computing module configured to perform parity check.

3. The apparatus according to claim 2, wherein the computing module is further configured to perform data encryption and decryption.

4. The apparatus according to claim 2, further comprising a memory controller configured to:
   initiate a read request to a system memory in the data storage device;
   receive data and a parameter for computing parity check;

allocate computational resources in the computing module; and send a result of computing to a processor in the data storage device.

5. The apparatus according to claim 4, wherein the controller is configured to allocate a part of computational resources in idle computational resources in the computing module for computing parity check.

6. The apparatus according to claim 1, further comprising:
a mirror module configured to copy data received by the volatile memory from a system memory in the data storage device to a further volatile memory.

7. The apparatus according to claim 6, wherein the mirror unit is configured to directly copy the data in the volatile memory to the further volatile memory through an interconnection module of the apparatus.

8. The apparatus according to claim 7, wherein the mirror module includes a memory direct access unit configured to:
in response to an instruction from a processor in the data storage device, directly write data in the system memory into the volatile memory; and
directly copy the data via the interconnection module to the further volatile memory.

9. The apparatus according to claim 1, further comprising:
a PCI-Express interface module configured to exchange data and instructions via the PCI-Express link.

10. The apparatus according to claim 1, further comprising:
an updating module configured to update the apparatus based on the received data.

11. The apparatus according to claim 1, wherein non-volatile memory of the data storage device, which holds committed data, becomes unpowered in response to power-off of the power supply; and
wherein the programmable apparatus is configured to cause the backup battery unit to continue to supply power only to the volatile memory while the non-volatile memory of the data storage device remains unpowered to preserve dirty data in the volatile memory that was not committed to the non-volatile memory before power-off of the power supply.

12. A programmable apparatus used in a redundant array of independent disks device, comprising:
a computing module comprising a portion of a field programmable gate array (FPGA) configured to perform parity check; and
a power management module configured to:
detect power-off of a power supply, and
switch to a backup battery unit in a data storage device in response to detecting the power-off of the power supply;
the programmable apparatus being configured to cause the backup battery unit to only supply power to a volatile memory in the data storage device;
wherein the programmable apparatus is enabled to facilitate processing of data by the data storage device separate from a CPU;
when the CPU is powered by the power supply prior to power-off of the power supply;
wherein the CPU becomes unpowered in response to power-off of the power supply; and
wherein, in response to power-off of the power supply and switching to the backup battery unit, the volatile memory in the data storage device consumes power from the backup battery unit to maintain data previously written to the volatile memory.

13. The programmable apparatus according to claim 12, wherein the computing module is further configured to perform data encryption and decryption.

14. The programmable apparatus according to claim 12, further comprising:
a mirror module configured to copy data received by the volatile memory from a system memory in the data storage device to a further volatile memory.

15. The programmable apparatus according to claim 14, wherein the mirror unit is configured to directly copy data in the volatile memory to the further volatile memory through an interconnection module included in the programmable apparatus.

16. The programmable apparatus according to claim 15, wherein the mirror module is a memory direct access unit configured to:
in response to an instruction from a processor in the data storage device, directly write data in the system memory into the volatile memory; and
directly copy the data to the further volatile memory through the interconnection module.

17. The programmable apparatus according to claim 12, further comprising a PCI-Express interface module configured to exchange data and instructions via a PCI-Express link.

18. The programmable apparatus according to claim 12, further comprising an updating module configured to perform software update to the apparatus based on the received data.

19. The programmable apparatus according to claim 12, further comprising a controller that is configured to:
initiate a read request to a system memory in the data storage device;
receive data and a parameter for computing parity check;
allocate computational resources in the computing module; and
send a result of computing to the processor in the data storage device.

20. The programmable apparatus according to claim 19, wherein the controller is configured to allocate a part of computational resources in idle computational resources in the computing module for computing parity check.

* * * * *